(12) United States Patent
Angiolini et al.

(10) Patent No.: US 7,995,599 B2
(45) Date of Patent: Aug. 9, 2011

(54) METHOD TO MANAGE THE LOAD OF PERIPHERAL ELEMENTS WITHIN A MULTICORE SYSTEM

(75) Inventors: Federico Angiolini, Bologna (IT); David Atienza Alonso, Chavannes (CH); Giovanni De Micheli, Lausanne (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 145 days.

(21) Appl. No.: 12/412,742

(22) Filed: Mar. 27, 2009

(65) Prior Publication Data

US 2010/0080124 A1     Apr. 1, 2010

Related U.S. Application Data

(63) Continuation-in-part of application No. PCT/IB2007/053909, filed on Sep. 26, 2007.

(60) Provisional application No. 60/847,368, filed on Sep. 27, 2006.

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl. ........ 370/419; 370/235; 370/352; 370/389; 709/232

(58) Field of Classification Search .......... 370/389–392, 370/397–458, 235–254, 406–419; 709/232–250
See application file for complete search history.

(56) References Cited

U.S. PATENT DOCUMENTS

| | | | |
|---|---|---|---|
| 7,013,354 B1 * | 3/2006 | Beck et al. ................... 710/105 |
| 7,036,042 B1 | 4/2006 | Nguyen |
| 7,564,865 B2 * | 7/2009 | Radulescu ................... 370/458 |
| 7,792,030 B2 * | 9/2010 | Mangano et al. .......... 370/230.1 |
| 7,813,363 B2 * | 10/2010 | Lee et al. ...................... 370/412 |

(Continued)

FOREIGN PATENT DOCUMENTS

WO     2008/038235 A2     4/2008

OTHER PUBLICATIONS

International Search Report issued in PCT/IB2007/053909, dated Apr. 7, 2008.

(Continued)

*Primary Examiner* — Man Phan
(74) *Attorney, Agent, or Firm* — DLA Piper LLP US

(57) ABSTRACT

A method to provide reliability, power management and load balancing support for multicore systems based on Networks-on-Chip (NoCs) and to efficiently implement architectural support for this method by introducing complex packet handling mechanisms is achieved by modifying the basic network interfaces attached to the cores of multicore computation systems. It also proposes policies to leverage the proposed hardware extensions. This aim is achieved with a method to manage the load of peripheral elements within a multicore system comprising several processing units accessing peripheral elements through a NoC, each processing unit and peripheral element attached to a Network Interface in charge of formatting and driving the packets sent to or received from the NoC, wherein, while considering at least two peripheral elements having a similar function, the Network Interface dedicated to a first peripheral element reroutes the incoming packets to a second Network Interface dedicated to a second peripheral element.

24 Claims, 3 Drawing Sheets

U.S. PATENT DOCUMENTS

| | | | | |
|---|---|---|---|---|
| 2007/0115939 | A1* | 5/2007 | Lee et al. | 370/352 |
| 2008/0126569 | A1* | 5/2008 | Rhim et al. | 709/250 |
| 2008/0186998 | A1* | 8/2008 | Rijpkema | 370/458 |
| 2008/0205432 | A1* | 8/2008 | Gangwal | 370/458 |
| 2008/0215786 | A1* | 9/2008 | Goossens et al. | 710/243 |
| 2008/0320161 | A1* | 12/2008 | Maruccia et al. | 709/232 |
| 2009/0122703 | A1* | 5/2009 | Gangwal et al. | 370/235 |
| 2009/0147783 | A1* | 6/2009 | Maruccia et al. | 370/389 |
| 2009/0300292 | A1* | 12/2009 | Fang et al. | 711/141 |

OTHER PUBLICATIONS

Angiolini, F., et al. "Networks on Chips: A Synthesis Perspective", XP002473818, Jul. 22, 2006, pp. 745-752.

Angiolini, F., et al. "Reliability Support for On-Chip Memories Using Networks-on-Chip", ICCD Proceedings 2006, XP002473819, Oct. 4, 2006, pp. 296-306.

Pande, P., et al., "High-Throughput Switch-Based Interconnect for Future SoCs" Proceedings of the IEEE International Workshop on System-On-Chip for Real-Time Applications, IEEE, XP002320368, Jul. 2003, pp. 304-310.

* cited by examiner

METHOD TO MANAGE THE LOAD OF PERIPHERAL ELEMENTS WITHIN A MULTICORE SYSTEM

CROSS REFERENCE TO APPLICATIONS

The present application is a Continuation-In-Part of an international application serial number PCT/IB2007/053909 filed Sep. 26, 2007, which claims priority from U.S. Provisional Application Ser. No. 60/847,368 filed Sep. 27, 2006, both of which is incorporated herein by reference in its entirety.

INTRODUCTION

NETWORKS-ON-CHIP (NOCS), a packet-switched interconnection system for on-chip communication among cores, represent a scalable infrastructure for next generation multicore computation systems. Multicore computation system applications include a very important part of the consumer electronics market, like mobile phones, encryption systems, wireless communication products, GPS navigators, set-top boxes and multimedia portable devices (such as MP3 or video players) among others.

The broad potential field of application of NoCs means that target devices will have very diverse requirements. Some of them will demand high performance processing, some will need very low-power operation, and some others will require maximum reliability.

One of the main advantages of NoCs, thanks to their packet-switching paradigm and distributed nature, is the extensive possibility of adaptation to the aforementioned different requirements for final devices. This is feasible thanks to the large available spectrum for configuration and customization of several characteristics and power/performance/cost tradeoffs. In this patent application, we leverage these degrees of freedom to show techniques which allow the optimization of NoCs towards one or more of the objectives mentioned above: higher performance, power management and/or reliable operation. In all these cases, our invention advocates modifications in the Network Interface (NI) of the affected components to provide effective solutions.

BRIEF DESCRIPTION OF THE INVENTION

The aim of the present invention is to propose a method to provide reliability, power management and load balancing support for multicore systems based on Networks-on-Chip (NoCs) as well as a way to efficiently implement architectural support for this method by introducing complex packet handling mechanisms achieved by modifying the basic network interfaces attached to the cores of multicore computation systems. The present invention provides also a solution in interrupt-based support in NoCs for multicore computation systems against transient failures or other system-level issues while the system is executing a certain application. It also proposes policies to leverage the proposed hardware extensions.

This aim is achieved thanks to a method to manage the load of peripheral elements within a multicore system, said multicore system comprising several processing units accessing peripheral elements through a Network on Chip (NoC), each processing unit and peripheral element attached to a Network Interface in charge of formatting and driving the packets sent to or received from the Network on Chip, wherein, while considering at least two peripheral elements having a similar function, the Network Interface dedicated to a first peripheral element reroutes the incoming packets to a second Network Interface dedicated to a second peripheral element.

BRIEF DESCRIPTION OF THE FIGURES

The present invention will be better understood thanks to the attached figures in which:
the FIG. 1 illustrates a general view of a multicore system based on a NoC.
the FIG. 2 illustrate examples of target Network Interface additions:
 (2a) Plain target Network Interface architecture.
 (2b) Extended target Network Interface architecture.
the FIG. 3 illustrate examples of packet handling in the system upon a hardware failure.
 (3a) Normal operation
 (3b) First phase of recovery for failures
 (3c) Final operation mode after recovery from permanent failures
 (3d) Operation mode while a transient failure is pending

BASELINE MULTICORE SYSTEM ARCHITECTURE

Figure 1:
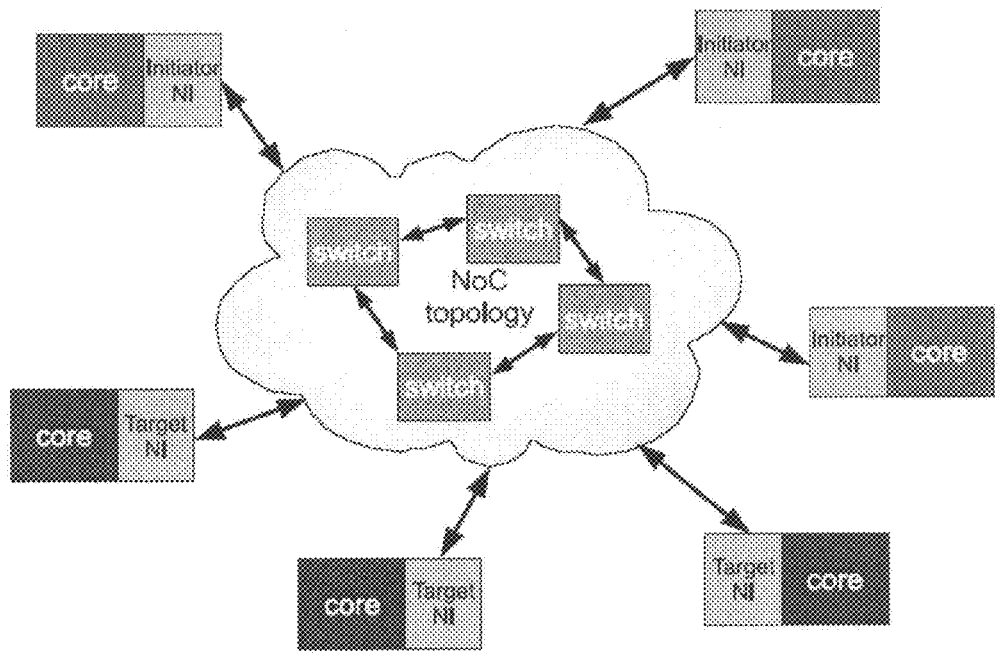

The reference multicore computation system architecture that we consider is composed (FIG. 1) of multiple processing units or peripheral elements (performing computation, DSP, data storage, I/O), and a communication system implemented by means of a NoC. The NoC transfers data among the cores in chunks typically called packets. The processing units are the active elements, i.e. requesting and building data such as DSP, processor. The peripheral elements comprise memories, input-output devices, encryption/decryption module, i.e. elements that provide functionalities for the processing units. These elements could be any other hardware device on the chip too.

A typical NoC is built around three main conceptual blocks: NETWORK INTERFACES (NIS), SWITCHES (also called routers) and LINKS. Network interfaces perform protocol conversion from the native pinout of system cores to NoC packets, or vice versa; switches deliver packets to their recipients; and finally, links connect the previous blocks to each other.

In a multicore system, some peripheral elements could be permanently or temporarily in a state of either activity or inactivity. Assuming for example that the active state is the normal mode of operation, a peripheral element may become inactive for example upon a (permanent or temporary) failure, or upon a power off event (allowing for energy savings). Peripheral elements may transition back to the active state if the temporary failure is resolved, or if the power supply is resumed. Additional conditions could drive the transition among the active and inactive states.

Complex Packet Handling and its Applications

In the present application, we propose extensions to the hardware of the NoC to support sophisticated handling of packets, namely, we present modifications of the basic NI modules.

The simplest, and most commonly used, packet flow in a NoC is as follows.

The elements attached to the NoC are either "initiators" (processing units i.e. active) or "targets" (peripheral elements i.e. passive); for instance, a typical initiator is a processor, whereas a usual target is a memory.

Moreover, some devices may be both initiators and targets, such as Direct Memory Access (DMA) blocks or I/O controllers. In the system, initiators are the only components which are allowed to initiate a communication; to this end, they send a packet ("request") to a system target. The target then may or may not issue a reply packet ("response"). For instance, a request by an initiator to load data will mandatorily trigger a response, while a request to store data typically will not. In addition, note that targets send packets only upon requests and only to the initiators who had queried them.

In a NoC, packets are delivered among initiators and targets along "routes" across the network. The routes that packets should follow are normally chosen at design time and physically stored on chip in memory elements called "routing tables". Routing tables contain a list of destination peripheral elements and of routes to reach them from the current location in the network. They can be part of NoC switches, but more often they are a part of each NI. For example, the routing table at an initiator NI will typically contain routes to all target peripheral elements towards which communication is needed, and vice versa, the routing table at a target NI will typically contain routes to all processing units towards which communication is needed.

We propose NoC modifications to extend this paradigm, while keeping the hardware overhead low. Our scheme does not require modifications to the switches and links of the NoC; only the NIs are extended to support the enhanced functionality. The main idea relies on the exploitation of the presence of multiple (identical or similar) instances of the same type of peripheral element attached directly to the NoC. In the following, we will collectively refer to these as a "pool" of cores.

For instance, a pool can consist of a set of accelerators, a set of memories, etc.

This arrangement is a very common property of multicore computation systems, either to comply with performance requirements or to improve reliability via redundancy.

As a consequence, in the present application, the routing tables of at least some of the NIs in the NoC are extended with a new memory element, or are made larger, such that they can also store routes to alternate peripheral elements. The extended routing tables contain a list of all possible alternate peripheral elements and the routes to send packets to each of them.

The extended routing tables can be instantiated either at the initiator NI or at the target NI. In the first case, packets can directly carry information describing multiple possible routes to multiple possible destinations, so that it becomes possible to send them to any of these. In the second case, packets reaching a target NI can be re-injected in the network by the target NI with a modified route to a new destination.

The extended routing tables can be populated at design time, since the number and position of the alternate peripheral elements does not change. Thanks to this and other proposed extensions (see Section "Hardware Extensions to Support Complex Packet Handling"), NIs acquire the capability of redirecting packets towards alternate peripheral elements in the pool. This capability can be exploited to achieve the following:

Balance the communication load among a pool of peripheral elements (identical or not), which improves performance.

Allow some of the devices in the pool to switch to a "power off" state to save power, while still being able to process incoming requests by transparently diverting them to alternate devices in the pool.

Handle permanent or transient failures of devices, by first keeping up-to-date synchronized copies of stored information, and then, upon the failure, by transparently diverting the traffic towards a working alternate device in the pool.

The extensions we propose are outlined in Section 4, while a more detailed description of some of the aforementioned possible uses is provided in Section 5.

Hardware Extensions to Support Complex Packet Handling

In the target Network Interface we implement the necessary extra logic to make possible one or more of the following actions:

Diverting some or all incoming packets to another peripheral element, attached elsewhere to the NoC. The incoming packets are received, partially modified by modifying at least their field which specifies the destination or route, and injected again into the network. The updated destination or route field can come either from an extended routing table in the target NI, or be directly contained in the incoming packet as an alternative to the current destination (which is the present target NI). In addition to the field of the incoming packet specifying its destination or route, other fields can be modified before reinjection into the network, for example to tag the packet as having been rerouted. In this action, the local peripheral element, attached to the Network Interface, does not receive the original packets, only the alternate peripheral element does receive and process them. This structure supports the processing of transactions even if the local peripheral element attached to the Network Interface is inactive for any reason, such as being turned off to save power, or having experienced a failure.

Forwarding a copy of some or all incoming packets to another peripheral element, attached elsewhere to the NoC. This action is similar to the action above and it can feature the same capabilities, but with the difference that the local peripheral element still receives the original packets. This is especially useful, for example, for request packets that modify the internal state of the local peripheral element (e.g. in case of a memory, the write requests), because it enables keeping the two peripheral element in a consistent state.

Sending status information to one or more initiators or targets, even without having received a direct request in the first place. This information is carried through packets that can be called "interrupt" packets. Interrupts are widely used in computing and have several uses; we are however not aware of any specific implementation to carry interrupts across a NoC. We focus on the delivery of such interrupts to notify changes of state, such as from active to inactive (e.g. due to power being switched off, or upon occurrence of a failure) and vice versa (e.g. due to power being switched on, or upon successful completion of a self-test routine). Interrupts could also convey information about the current load experienced by the target.

Receiving and processing incoming interrupt messages. This modification can be used to keep up-to-date information on whether peripheral elements in a pool are active or inactive, for example due to power management or hardware failures, or on their current load.

Figure 2A:
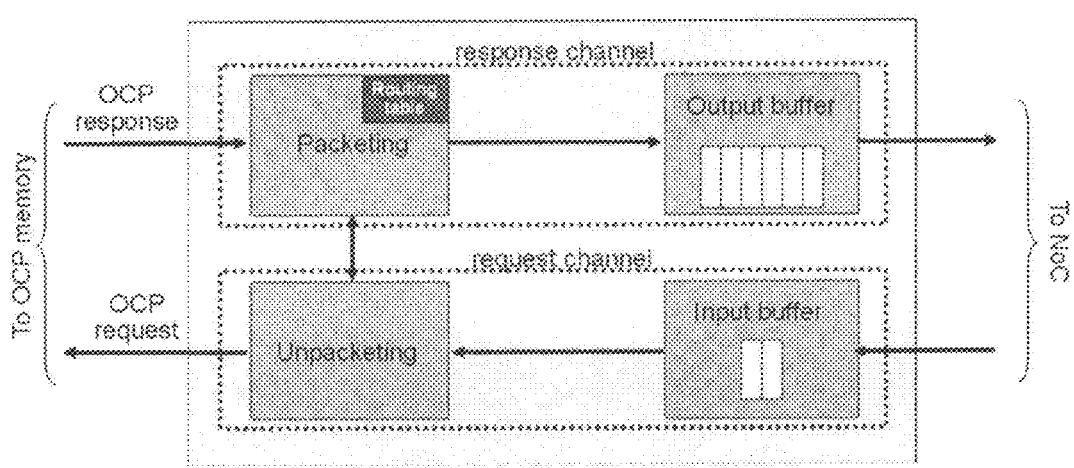
Figure 2B:
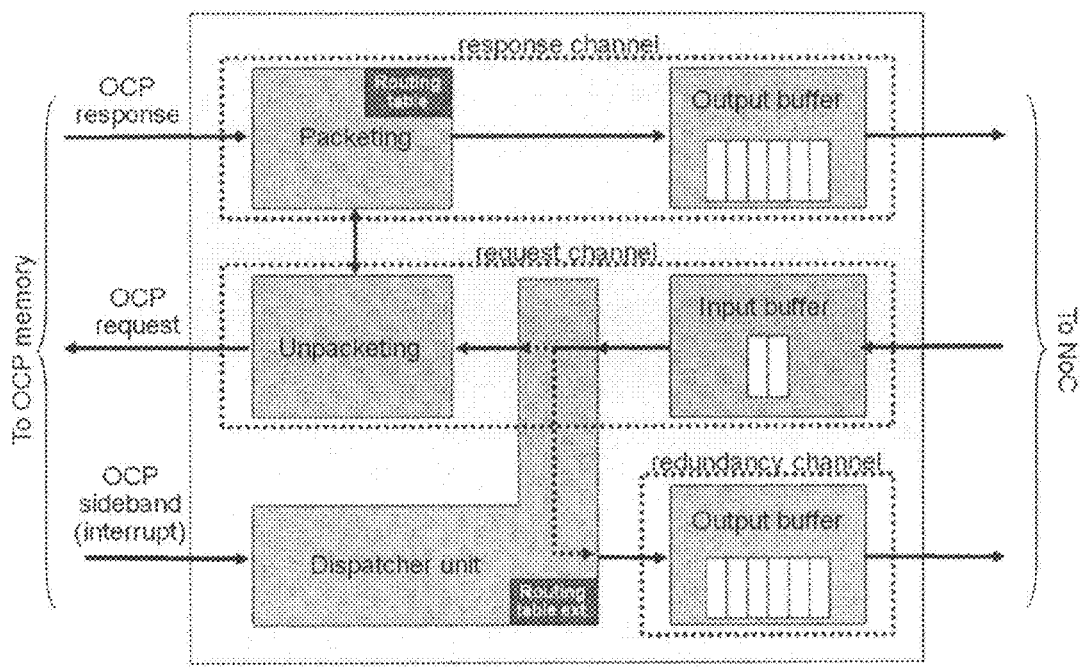

An example picture representing some of the extensions possible inside of a target NI is shown in FIG. 2. Example of target Network Interface additions required for one embodiment of the invention: (2a) Plain target Network Interface architecture, (2b) Extended target Network Interface architecture. In this example, the target Network Interface has an OCP pinout (the protocol could be another one) to communicate with a memory peripheral element, and features input and output buffering (which is optional). The extended target NI contains a "dispatcher unit"; this block is notified about rerouting opportunities or needs based, for example, on interrupts coming from the local memory peripheral element, indicating, for example, a hardware failure in the memory peripheral element or the entry into a low-power operation mode of the memory peripheral element. The dispatcher unit also features an extra routing table which has been programmed at design time with routes to possible alternate peripheral elements. The extended target Network Interface has the ability to process incoming packets ("request channel") as normally done in NoCs, but also to re-inject them into the NoC through its "redundancy channel", based on the decisions of the dispatcher unit, towards an alternate peripheral element. In this case, the dispatcher unit updates the incoming packet header to specify the new Network Interface NI before re-injecting into the NoC.

In the initiator Network Interface we implement additional logic that allows for one or more of the following actions:

Appending extra information within the request packets. This extension can be used to flag packets which require or tolerate special routing treatment. Thus, the receiving target Network Interface can more easily dispatch the packets. Request packets can also contain multiple destination or route fields, coming from an extended routing table and specifying multiple destinations within a pool of alternate peripheral elements, so that the receiving target Network Interface can more easily dispatch the packets.

Detecting the sender of response packets, by checking a special SourceID field in the header of such packets. This architectural modification can be used to detect whether a request packet received a response from the intended peripheral element, or from another peripheral element attached to the NoC.

Receiving and processing incoming interrupt messages. This modification can be used to keep up-to-date information on whether peripheral elements in a pool are active or inactive, for example due to power management or hardware failures, or on their current load.

Switching among multiple alternate entries in its routing tables to choose where to direct some of its requests. This modification allows to pick any of the peripheral elements in a pool as recipients for the transactions.

APPLICATIONS OF THE INVENTION

Performance Improvement: Load Balancing

The invention can be used to improve the system performance by balancing the workload among the peripheral elements available within a pool. Let us assume that Device A and Device B are twin coprocessors. If excessive load is detected at Device A, the NI attached to Device A can divert (reroute) incoming request packets to Device B, reducing the load on Device A.

Optionally, the initiator NIs in the multicore computation system, upon detecting that requests to Device A received answers from Device B, can leverage secondary entries in their internal routing tables to directly send transactions to Device B. This optional behavior increases performance further, by reducing the number of hops that requests have to go through to reach the final destination (i.e. Device B).

Another possible extension is the use of interrupt packets to notify initiators of the load of Device A and Device B, or to let the Devices exchange information about their loads. Additional support at the software level may in this case be envisioned.

Load Balancing Policies

The sensing of the current load may e.g. happen within Device A itself, within the NI attached to Device A, or within dedicated monitoring logic. A possible metric may be the activity of the Device (if measured within Device A), the amount of incoming packets per time window (if measured within the attached NI), or the global load on the peripheral element pool (if measured by a centralized component). The rerouting may happen when some load threshold is trespassed, and may involve only a certain percentage of the incoming packets, or be based on time slots where no requests are accepted at all.

To provide proper balancing, a priority chain may be established; in an example with four devices (Device A to D), Device A may always redirect its excess load to Device B, which in turn may resort to Device C, which in turn may resort to Device D, and from here back to Device A ("daisy chain"). As a possible alternative, devices may be arranged in pairs to absorb load spikes. To prevent endless loops (live-locks), where packets are always rerouted and never processed, the rerouted packets may carry a flag to avoid being further rerouted. As a different option, Device A may be outright redirecting its excess load to all of the Devices B to D ("broadcast"), some of which will accept the additional load.

The alternate peripheral elements in the pool may be identical or not. For example, a request may be preferentially directed to a specifically tailored accelerator (Device A), which is optimally suited for the task. The alternate device (Device B) may be a more general-purpose component, maybe serving as an alternate processing resource for several different tasks, and therefore less efficient at the task at hand.

The rerouting may in this case still happen, but thresholds and policies may be adjusted to favor the most suitable peripheral element in the pool.

System initiators may try to natively balance the system load, i.e. by explicitly accessing all the Devices with equal frequency. This behavior can either be achieved in hardware or dictated by the software. However, the success of this strategy is limited by the lack of knowledge of what other system initiators are doing, resulting in unbalanced traffic over given time windows. The support for load balancing within the NoC helps in absorbing such load peaks, resulting in better overall performance. The system initiators may always send requests to a single device in the pool, and let the NoC smooth the load by itself.

System initiators may be instructed to assist the load balancing strategies through an interrupt mechanism. In this case, they would be aware of the current load level of all peripheral elements in the pool. Hence, they would be able to direct traffic in a better way to each specific peripheral element according to the current peripheral element situation. Alternatively, the same information could be shared among the peripheral elements in the pool by sending interrupts to each other. This is not a requirement, but enables the development of additional flexible load balancing policies at the software/application level.

All the discussed policies can be readily implemented given the hardware facilities discussed above.

Power Management Powering Devices on and Off

Upon varying load conditions, if a pool of parallel peripheral elements is available, it is desirable to power on and off some of the devices over time to minimize the energy drain.

As an example, let us assume that a processor is leveraging two coprocessors (Device A and Device B) to achieve better performance. However, the peak load occurs only rarely, while the average one is less than 50% of the peak. In this case, the initiator NI attached to the processor could be configured to send requests to both coprocessors. However, upon detection of low load, Device A could be completely powered off. Its NI would then redirect transactions to Device B, therefore guaranteeing proper processing while still saving power. This is more effective than simply turning Device A on and off repeatedly, as it incurs a lower performance overhead while maximizing power savings and reliability.

Efficiency can be increased even more by optionally leveraging functionality in the initiator. When the initiator detects that all transactions are actually being handled by Device B, latency can be saved by querying Device B directly. This is achieved by querying secondary routing table entries that have been added to the basic initiator NI.

Power Management Policies

The sensing of the current load may e.g. happen within Device A itself, within the NI attached to Device A, or within dedicated monitoring logic. A possible metric may be the activity of the Device (if measured within Device A), the amount of incoming packets per time window (if measured within the attached NI), or the global load on the peripheral element pool (if measured by a centralized component).

Power management strategies could be based on centralized knowledge, where a global module is aware of the whole system behavior and takes system-wide decisions, which are then broadcast to all the peripheral elements. However, such modules may be complex to design, also because it is not always practical to inform every system module about the power state of all the others. While still leaving this possibility open, the NoC extensions we propose also enable local decisions to be taken.

Another issue is that powering a device on and off may imply a time overhead, and doing it too often may affect the reliability of the device as well. Therefore, while a device could be turned on and off on-demand, it would be desirable to provide a facility to limit the frequency of the power management events. This unfortunately is not easily achievable in a multi-processor system, where several initiators may be accessing the same devices simultaneously. Our extensions provide a transparent handling of the power states, possibly removing the need for higher-level protocols to constrain the frequency of the switching events.

As an example, Device A may spontaneously decide to turn itself off when the detected load is below a certain threshold, letting its associated NI reroute all the incoming traffic to another peripheral element in the pool. Then, Device A may turn on again only when the incoming traffic trespasses another threshold, indicating that its computational help is required again. The thresholds can be set in such a way that the power state transitions happen with optimal frequency to maximize reliability of the component, and they may even be tuned at runtime by predictive algorithms.

The existence of the latter threshold also provides one of the possible solutions to the problem where all the devices in the pool may try to turn themselves off, leaving no resource available for the actual processing.

Many of the considerations in Section "Load Balancing Policies" still apply in this context. All the discussed policies can be implemented by only relying on the hardware facilities discussed in Section "Hardware Extensions to Support Complex Packet Handling".

Reliable Operation Handling Permanent and Transient Faults

In this case, let us take an example where the NoC connects a Processor to two memories, called Main Memory and Backup Memory. During normal operation, requests by the Processor are sent to the Main Memory. The NI attached to the Main Memory keeps the Backup Memory in sync by forwarding all write transactions, such that the contents of the two are always the same (albeit potentially after a short delay). Upon a permanent failure, all traffic requests (including read requests) are diverted to the Backup Memory with an unchanged SourceID field. Therefore, the Backup Memory directly replies to the Processor and the failure is transparently handled.

Figures 3A, 3B:
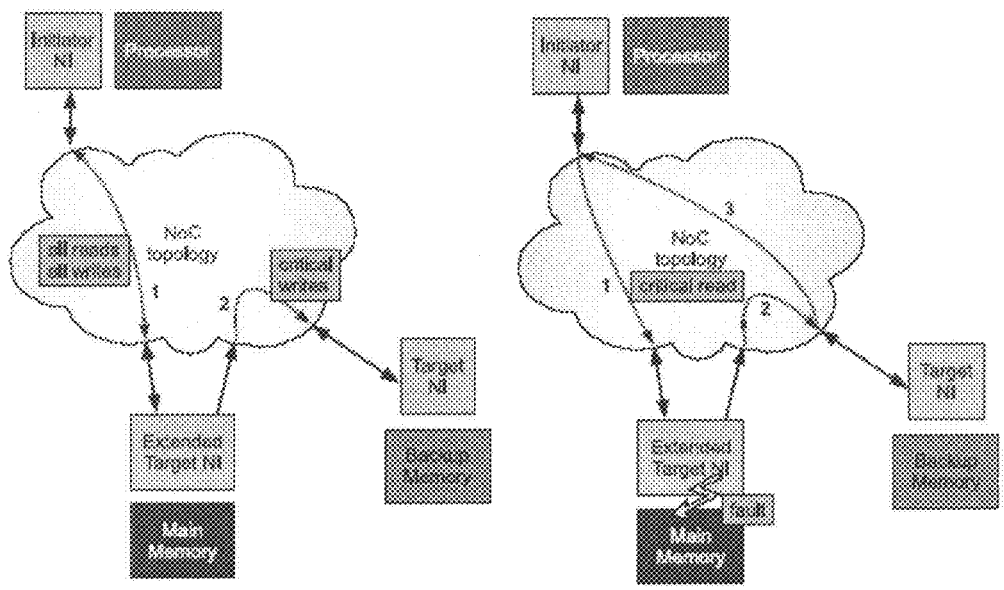
Figure 3C:
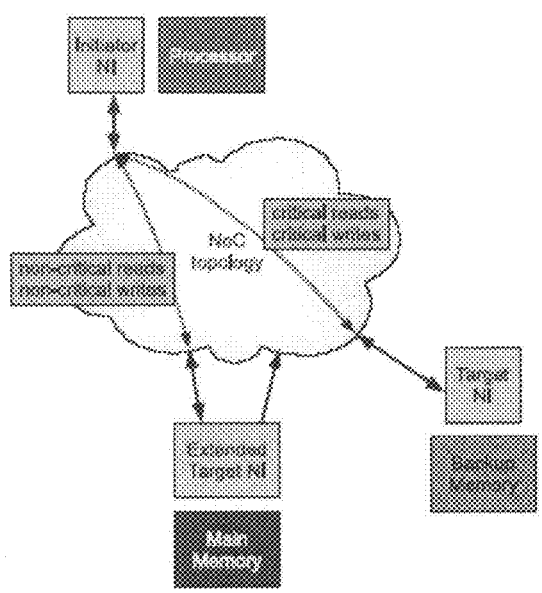
Figure 3D:
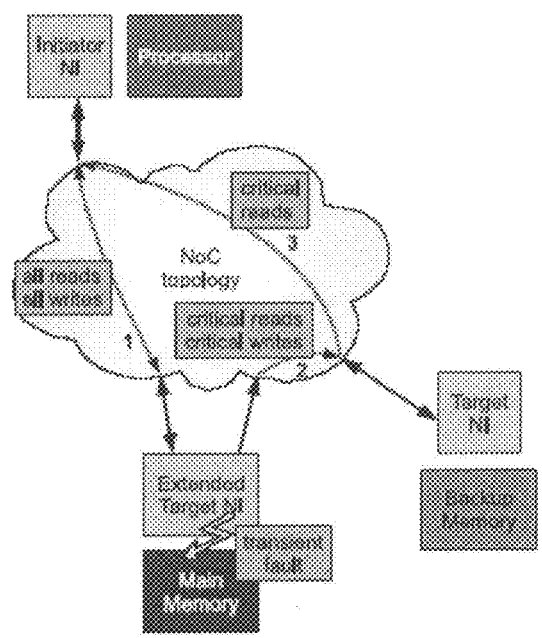

A schematic depiction of some relevant packet routing conditions is presented in FIG. 3 which shows examples of packet handling in the system upon a hardware failure. The system comprises one processing element ("Processor") and two memory peripheral elements ("Main Memory" and "Backup Memory"). (3a) Normal operation: the Main Memory is used, but the transactions which modify at least a critical subset of the Main Memory contents are also rerouted to the Backup Memory, so as to have a backup of critical data. (3b) First phase of recovery for failures: if a failure occurs, read transactions concerning the critical data portion can be rerouted to the Backup Memory, which sends responses directly to the Processor. (3c) Final operation mode after recovery from permanent failures: the Processor notices that responses to requests of critical data are now coming from the Backup Memory, and therefore queries it directly. Non-critical data, for which no backup is available, is still retrieved from the Main Memory. (3d) Operation mode while a transient failure is pending: since the Main Memory is not fully reliable, but may recover functionality later, it is still the default recipient for all transactions.

Efficiency can be increased even more by optionally leveraging functionality in the initiator. In this case, when the initiator detects that responses to transactions are coming from the Backup Memory, latency can be saved by querying the Backup Memory directly. This is achieved by querying secondary routing table entries that have been added at design time to the initiator NIs.

The case of transient failures is a bit different, namely, the memory is supposed to be able to recover from the failure at a certain (unpredictable) moment in the future. An example of this type of failure could be a condition of overheating, which induces faults; the faults disappear if the device cools down at a later point in time. At the time of the failure, the recovery mechanism is the same outlined above, namely, all transactions are rerouted to the Backup Memory. It is important to note that a side effect is that the Backup Memory and the Main Memory contents begin to diverge at this point, with the Backup Memory being the most up-to-date. If a thermal probe subsequently notifies that the temporary failure has been recovered from, an interrupt should be sent to the Processor. The interrupt handling routine may choose how to best respond to restore system operation, as exemplified below.

Fault Handling Policies

The sensing of failures may e.g. happen within the Memory itself, within the NI attached to the Memory, or within dedicated monitoring logic. The sensing may be based on error detection codes, such as Cyclic Redundancy Check (CRC) codes, or on the analysis of operating parameters, like results obtained via temperature sensing, coupled with fault occurrence models.

One possible efficient embodiment of the proposed scheme is based on the presence of large, fast Main Memories coupled with slower, more reliable Backup Memories. In this case, the Backup Memories would provide a very dependable replacement for the faulty Main Memories upon errors, while limiting the power consumption of the architecture under normal operation.

The size of the Backup Memories could also be trimmed down for a large class of applications, such as multimedia, for which only some data structures are really key for proper computation, while most of the input data can be affected by some errors without a large impact on the user-perceived quality of the results (e.g. few blurred or black pixels on the user screen). In this type of applications with very limited fundamental data, the initiator NIs may be programmed to only flag the relevant critical transactions for backup storage, exploiting the extensions in the header format introduced in Section 4, and increasing significantly the efficient utilization of Backup Memories (e.g. one Backup Memory can be used to store the critical data of several input streams due to their small size).

Several schemes can be used to recover from transient failures using interrupts, which can signal the return to normal functionality of a temporarily faulty Memory to the Processors. A first possible scheme in this case is that the data in the Backup Memory could be immediately copied back to the Main Memory, at which point the system operation could be resumed in a normal way. A second feasible scheme would be the continuation of the processing directly on the Backup Memory. In a third possible scheme, processing could continue on the Backup Memory until some checkpoint is reached. This checkpoint could represent a program condition upon which most or all the data in memory could be discarded. Hence, the remaining small relevant portions of data, if any, could more efficiently copied back to the Main Memory, or simply new input data (e.g. new image frames) could be fetched from an external device, such as a video camera, directly into the Main Memory to replace the old data.

Many of the considerations in Section "Load Balancing Policies" still apply in this context. All the discussed policies can be implemented by only relying on the hardware facilities discussed in Section "Hardware Extensions to Support Complex Packet Handling".

What is claimed is:

1. A method to manage a load of peripheral elements within a multicore system, said multicore system comprising several processing units accessing peripheral elements through a Network on Chip, each processing unit and peripheral element being attached to a Network Interface in charge of formatting and driving the packets sent to or received from the Network on Chip, the method comprising the steps of:
   sending a data packet from a sender Network Interface dedicated to a processing unit to a first target Network Interface dedicated to a first peripheral element through the Network on Chip, said data packet having routing information allowing the Network on Chip to route the data packet to the target Network Interface;
   determining at least one second peripheral element having a function similar to a function of the first peripheral element, said second peripheral element being attached to a second target Network Interface;
   updating an incoming data packet in said first target Network Interface with routing information suitable to transmit it across the Network on Chip towards the second peripheral element; and
   reinjecting the updated incoming data packet from said first target Network. Interface into the Network on Chip;
   wherein routing information of the incoming data packet comprises information suitable to transmit said packet across the Network on Chip towards the first peripheral element as main choice and additional routing information suitable to transmit it across the Network on Chip towards one or more additional peripheral elements as secondary choice, the updating of the incoming data packet by the target Network interface of the first peripheral element consisting of setting one of the secondary choices as the main choice.

2. The method of claim 1, wherein the Network Interface of the first peripheral element comprises an internal memory storing the routing information suitable to transmit it across the Network on Chip towards the second peripheral element.

3. The method of claim 1, wherein the incoming data packet is not only rerouted to the second peripheral element, but also processed internally by the first peripheral element.

4. The method of claim 1, wherein the reinjecting step is performed when the first peripheral element reaches a predefined working condition.

5. The method of claim 4, wherein when a packet is sent to the Network Interface of a peripheral element in an active state, the packet is processed by the peripheral element and also rerouted to another peripheral element having a similar function, while when a packet is sent to the Network Interface of a peripheral element in an inactive state, the packet is rerouted to another peripheral element having a similar function but is not processed by the peripheral element in the inactive state.

6. The method of claim 4, wherein, when the rerouting rate of the Network Interface associated to an inactive peripheral element exceeds a predefined threshold, and the inactive peripheral element can be switched to an active state, the inactive peripheral element is switched to the active state.

7. The method of claim 4, wherein, when the rate of packets reaching the Network Interface associated to an active peripheral element becomes lower than a predefined threshold, and the peripheral element can be switched to an inactive state, the peripheral element is switched to an inactive state.

8. The method of claim 1, wherein if more than two peripheral elements having a similar function are present in the multicore system, packets can be rerouted multiple times by Network Interfaces associated to peripheral elements to other Network Interfaces associated to other peripheral elements.

9. The method of claim 8, wherein the multiple reroutings occur sequentially.

10. The method of claim 8, wherein the multiple reroutings occur concurrently.

11. The method of claim 1, wherein a response related to the incoming data packet received by the second peripheral element is sent directly to the sender Network Interface by said second peripheral element.

12. The method of claim 11, wherein the response sent by the second peripheral element contains an indication that said second peripheral element has processed the packet instead of the first peripheral element, and the sender Network Interface contains means allowing to direct further packets directly to said second peripheral element.

13. The method of claim 1, wherein a response related to the incoming packet received by the second peripheral element is sent to the Network Interface of the first peripheral element for further transmission to the sender Network Interface.

14. The method of claim 13, wherein the response sent by the second peripheral element contains indication that said second peripheral element has processed the packet instead of the first peripheral element, and the sender Network Interface contains means allowing to direct further packets directly to said second peripheral element.

15. The method of claim 1, wherein the processing units embed in the data packets information to specify whether a rerouting or forwarding is or is not desirable.

16. The method of claim 1, wherein the peripheral elements may send status packets to the processing units indicating their current load or state, and this information is used by the processing units to tag subsequent requests as either suitable or not for rerouting.

17. The method of claim 1, wherein the peripheral elements may send status packets to the processing units indicating their current load or state, and this information is used by the processing units to select to which peripheral elements subsequent requests should be sent.

18. The method of claim 1, wherein the peripheral elements may send status packets to each other indicating their current load or state, and this information is used by the peripheral elements to select whether it is desirable or not to reroute subsequent requests.

19. The method of claim 1, wherein the peripheral elements may send status packets to each other indicating their current load or state, and this information is used by the peripheral elements to select to which peripheral elements subsequent requests, should be rerouted.

20. The method of claim 1, wherein rerouted packets may additionally be modified to carry information about the occurrence of said reroutings or to adjust said rerouted packets to a different packet format possibly required by the Network Interface attached to the new destination peripheral element.

21. A method to manage a the load of peripheral elements within a multicore system, said multicore system comprising several processing units accessing peripheral elements through a Network on Chip, each processing unit and peripheral element being attached to a Network Interface in charge of formatting and driving the packets sent to or received from the Network on Chip, the method comprising the steps of:
   sending a data packet from a sender Network Interface dedicated to a processing unit to a first target Network Interface dedicated to a first peripheral element through the Network on Chip, said data packet having routing information allowing the Network on Chip to route the data packet to the target Network Interface;
   determining at least one second peripheral element having a function similar to a function of the first peripheral element, said second peripheral element being attached to a second target Network Interface;
   updating an incoming data packet in said first target Network Interface with routing information suitable to transmit it across the Network on Chip towards the second peripheral element; and
   reinjecting the updated incoming data packet from said first target Network Interface into the Network on Chip;
   wherein the reinjecting step is performed when the first peripheral element reaches a predefined working condition and wherein, when a packet is sent to the Network Interface of a peripheral element in an active state, the packet is processed by the peripheral element in the active state and is also rerouted to another peripheral element having a similar function, while when a packet is sent to the Network Interface of a peripheral element in an inactive state, the packet is rerouted to another peripheral element having a similar function but is not processed by the peripheral element in the inactive state.

22. The method of claim 21, wherein routing information of the incoming data packet comprises information suitable to transmit said packet across the Network on Chip towards the first peripheral element as a main choice and additional routing information suitable to transmit it across the Network on Chip towards one or more additional peripheral elements as one or more secondary choices, the updating of the incoming data packet by the target. Network interface of the first peripheral element consisting of setting one of the secondary choices as the main choice.

23. A method to manage a the load of peripheral elements within a multicore system, said multicore system comprising several processing units accessing peripheral elements through a Network on Chip, each processing unit and peripheral element being attached to a Network Interface in charge of formatting and driving the packets sent to or received from the Network on Chip, the method comprising the steps of:
   sending a data packet from a sender Network Interface dedicated to a processing unit to a first target Network Interface dedicated to a first peripheral element through the Network on Chip, said data packet having routing information allowing the Network on Chip to route the data packet to the target Network Interface;
   determining at least one second peripheral element having a function similar to a function of the first peripheral element, said second peripheral element being attached to a second target Network Interface;
   updating an incoming data packet in said first target Network Interface with routing information suitable to transmit it across the Network on Chip towards the second peripheral element; and
   reinjecting the updated incoming data packet from said first target Network Interface into the Network on Chip;
   wherein the reinjecting step is performed when the first peripheral element reaches a predefined working condition and wherein, when the rerouting rate of the Network Interface associated to an inactive peripheral element exceeds a predefined threshold, and the inactive peripheral element can be switched to an active state, the inactive peripheral element is switched to the active state.

24. A method to manage a the load of peripheral elements within a multicore system, said multicore system comprising several processing units accessing peripheral elements through a Network on Chip, each processing unit and peripheral element being attached to a Network Interface in charge of formatting and driving the packets sent to or received from the Network on Chip, the method comprising the steps of:
   sending a data packet from a sender. Network Interface dedicated to a processing unit to a first target Network Interface dedicated to a first peripheral element through the Network on Chip, said data packet having routing information allowing the Network on Chip to route the data packet to the target Network Interface;
   determining at least one second peripheral element having a function similar to a function of the first peripheral element, said second peripheral element being attached to a second target Network Interface;
   updating an incoming data packet in said first target Network Interface with routing information suitable to transmit it across the Network on Chip towards the second peripheral element; and
   reinjecting the updated incoming data packet from said first target Network Interface into the Network on Chip;
   wherein the reinjecting step is performed when the first peripheral element reaches a predefined working condition and wherein, when the rate of packets reaching the Network Interface associated to an active peripheral element becomes lower than a predefined threshold, and the peripheral element can be switched to an inactive state, the peripheral element is switched to an inactive state.

* * * * *